United States Patent [19]

Langley

[11] 4,104,277

[45] Aug. 1, 1978

[54] PROCESS FOR PREPARING AN ALPHA OR BETA FORM COPPER PHTHALOCYANINE PIGMENT

[75] Inventor: Robert Langley, Glasgow, Scotland

[73] Assignee: Ciba-Geigy Corporation, Ardsley, N.Y.

[21] Appl. No.: 768,811

[22] Filed: Feb. 15, 1977

[30] Foreign Application Priority Data

Feb. 19, 1976 [GB] United Kingdom ............... 6571/76

[51] Int. Cl.$^2$ .............................................. C09D 47/04
[52] U.S. Cl. .................................. 260/314.5; 8/1 XA
[58] Field of Search .................. 260/314.5 S; 8/1 XA

[56] References Cited

U.S. PATENT DOCUMENTS

| 1,162,036 | 8/1969 | Bayer | 203/95 |
| 2,857,400 | 10/1958 | Cooper | 260/314.5 X |
| 3,017,414 | 1/1962 | Minnich et al. | 260/314.5 X |

FOREIGN PATENT DOCUMENTS 1,087,004 10/1967 United Kingdom ................. 260/314.5

*Primary Examiner*—Richard L. Raymond
*Attorney, Agent, or Firm*—Michael W. Glynn; Vincent J. Cavalieri

[57] ABSTRACT

A process for preparing an alpha or beta form copper phthalocyanine pigment which comprises dry milling a crude copper phthalocyanine followed by mixing with an aqueous emulsion comprising a liquid amine having from 3 to 20 carbon atoms which is insoluble in water or alkali and soluble in acid and a surfactant which is capable of emulsifying the liquid amine and subsequently acidifying the mixture to dissolve the amine.

13 Claims, No Drawings

PROCESS FOR PREPARING AN ALPHA OR BETA FORM COPPER PHTHALOCYANINE PIGMENT

The present invention relates to a process for preparing an alpha or beta form phthalocyanine pigment by dry milling a crude phthalocyanine blue and then treating with an emulsion of a liquid amine.

In U.S. Pat. No. 2,857,400 there is described a process in which a crude pigment is dry milled without salt and then treated with an organic liquid such as acetone which is afterwards removed by steam distillation.

In British Patent Specification No. 1,087,004 there is described a process for reducing the particle size of phthalocyanine pigments which comprises dry milling the pigment in the absence of salt and treating with a water emulsion of an aliphatic, halogenated aliphatic, or saturated cycloaliphatic hydrocarbon boiling between 35° C and 85° C and preferably removing the organic liquid by steam distillation.

In U.S. Pat. No. 3,017,414 there is described a process for reducing the particle size of a phthalocyanine pigment which comprises dry milling a crude phthalocyanine without salt and thereafter treating with an organic liquid in water emulsion wherein the organic liquid is nitrobenzene, benzonitrile an unsubstituted aromatic hydrocarbon, a chlorinated aromatic hydrocarbon or a chlorinated aliphatic hydrocarbon boiling between about 100° C to 250° and subsequently removing the organic liquid by steam distillation.

In the aforementioned processes the organic liquid is removed by steam distillation which is a relatively slow process and prolonged contact of the organic liquid with the pigment can lead to over crystallization. We have found that if a certain type of amine is used as the organic liquid in the form of an emulsion with a surfactant in a process similar to those described above, the organic liquid can be removed quickly by dissolving in acid and the crystallising effect of the organic liquid can be controlled.

According to the present invention there is provided a process for preparing an alpha or beta form copper phthalocyanine pigment which comprises dry milling a crude copper phthalocyanine followed by mixing with an aqueous emulsion comprising a liquid amine having from 3 to 20 carbon atoms which is insoluble in water or alkali and soluble in acid and a surfactant which is capable of emulsifying the liquid amine and subsequently acidifying the mixture to dissolve the amine.

Although the milling is preferably carried out in the complete absence of salt, small amounts of salt can be present without having a detrimental effect on the process or final pigmentary properties. The amount of salt that can be tolerated will depend upon the nature of the salt and the process in which it is present.

A chlorine free or chlorine containing crude copper phthalocyanine may be used for the preparation of the pigment. When a chlorine free crude copper phthalocyanine is used, the pigment produced is in the beta form and when a chlorine containing curde copper phthalocyanine is used, the pigment produced is either partially or completely in the alpha form.

The dry milling is carried out either in the complete absence of liquids or in an amount of liquid small enough to ensure that the pigment retains the characteristics of a dry powder. The milling may be carried out in apparatus such as a ball mill, vibrating mill or other comminution equipment.

If desired, the milling may be carried out in the presence of an additive which may act as a milling aid or improve the efficiency of the solvent treatment stage of the process or the performance of the final product. The amount of the additive used in the milling may conveniently be up to 20% by weight based on the weight of pigment. While it is possible to use amounts greater than 20%, no advantage is obtained in doing so and the amount used is preferably from 5% to 15% by weight based on the weight of pigment. Examples of suitable additives are phthalimide, phthalic anhydride, hydrogenated wood rosin or glyceryl mono oleate.

The liquid amine may be for example a mono-, di- or tri-amine and may be aliphatic, cycloaliphatic, heterocyclic or aromatic and examples of suitable amines are aniline, ortho-toluidine diethylaniline, dimethylaniline, n-butylamine, and an aliphatic diamine such as one having the formula

$$RNH.CH_2CH_2CH_2NH_2$$

wherein R is the tallow derivative.

The amount of liquid amine may conveniently be from 2% to 50% and preferably from 5% to 30% by weight based on the weight of pigment. While it is possible to use amounts greater than 50%, no advantage is obtained in doing so.

Any surfactant may be used provided that it emulsifies the liquid amine and has no detrimental effect on the final pigment. The surfactant may be anionic, cationic or nonionic. Examples of anionic surfactants are sodium dodecyl benzene sulphonate, potassium xylene sulphonate and the sodium or potassium salt of a tall-oil unsaturated resin or hydrogenated wood resin. Examples of cationic surfactants are coco amine or tallow amine derivatives of the formula

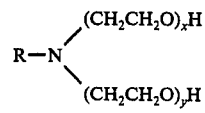

wherein R is a coco or tallow derivative and x and y are integers from 1 to 50, preferably from 1 to 20. The nonionic surfactant may be an alkyl phenol-ethylene oxide condensate for example nonyl phenol ethylene oxide condensate comprising 7 mols of ethylene oxide per molecule of condensate.

The amount of surfactant may conveniently be from 1% to 15% by weight based on the weight of pigment. While it is possible to use amounts greater than 15%, no advantage is obtained in doing so and the amount used is preferably from 2% to 10%.

The temperature of the treatment of the pigment with the emulsion may be from 0° C to 100° C but is preferably from 20° C to 70° C and especially 50° C to 70° C. The treatment is carried out in the presence of water conveniently in an amount up to 10 times, but preferably in an amount up to 5 times the amount of pigment on a weight for weight basis.

The treatment of the pigment with the emulsion may be carried out by high-speed stirring for example in a Silverson or Greaves Mixer capable of speeds of 6000 revolutions per minute. The treatment is carried out until the particle size of the bulk of the pigment particles is of the order of 1 micron or less. The time of the treatment may be up to about 20 hours depending upon the liquid amine used.

After the treatment, the mixture is acidified which dissolves the amine and precipitates the free resin if used as surfactant as the alkali metal salt. For example sulphuric acid may be used but hydrochloric acid is preferred. Sufficient acid is added to give a pH of about 1.0 to 1.5.

If a resinate is used as the surfactant, it is advantageous to add a salt which will precipitate the metal resinate and break the solvent/surfactant emulsion before adding the strong acid. Examples of such salts are barium chloride and zinc chloride but calcium chloride is preferred. The formation of a metal resinate before acidification gives a product with improved dispersibility. The amount of salt added is conveniently slightly in excess of that necessary to precipitate the resin.

After acidification the pigment slurry may be filtered, washed with water until free of acid and chloride ions and dried.

The pigment produced is useful in oil ink systems in which it shows good dispersibility and rheology as well as high colour strength, particularly if compared using conventional ink making techniques with the milled material prior to solvent treatment. The pigment is also suitable for publication gravure inks, paint and plastics.

The following Examples further illustrate the present invention.

EXAMPLE 1

92 parts of crude copper phthalocyanine pigment is ground in a ball-mill with 8 parts of phthalimide. Grinding is carried out until the phase change gives an $\alpha$ content of between 45 → 75%.

100 parts of water at 50° C, 22.5 parts of 50% caustic potash liquor, 10 parts of hydrogenated wood resin and 18.7 parts of diethylaniline are high-speed stirred until an emulsion is obtained.

100 parts of the ground crude copper phthalocyanine pigment as described above and 200 parts of water at 50° C are added to the emulsion. The pigmented emulsion is high-speed stirred until the average particle size is 1 $\mu$ or less.

A solution of 5 parts of calcium chloride in 450 parts of water at 50° C is added, the pigment slurry is stirred for 30 minutes and 70.8 parts of hydrochloric acid and 60 parts of water at 50° C are added.

The acidified pigment slurry is filtered, washed with water until pigment is free of acid and chloride ions.

The $\beta$ pigment presscake is dried at 50° –60° C.

EXAMPLE 2

92 parts of crude copper phthalocyanine pigment is ground in a ball-mill with 8 parts of phthalimide. Grinding is carried out until the phase change gives an $\alpha$ content of between 45 → 75%.

100 parts of water at 50° C, 22.5 parts of 50% caustic potash liquor, 10 parts of hydrogenated wood resin and 23.4 parts of diethylaniline are high-speed stirred until an emulsion is obtained.

100 parts of the ground crude copper phthalocyanine pigment as describe above and 200 parts of water at 50° C are added to the emulsion. The pigmented emulsion is high-speed stirred until the average particle size is 1 $\mu$ or less.

A solution of 5 parts of calcium chloride in 450 parts of water at 50° C is added, the pigment slurry is stirred for 30 minutes and 70.8 parts of hydrochloric acid and 60 parts of water at 50° C are added, The acidified pigment slurry is filtered, washed with water until pigment is free of acid and chloride ions.

The $\beta$ pigment presscake is dired at 50°–60° C.

EXAMPLE 3

92 parts of crude copper phthalocyanine pigment is ground in a ball-mill with 8 parts of phthalimide. Grinding is carried out until the phase change gives an $\alpha$ content of between 45 → 75%.

100 parts of water at 50° C, 22.5 parts of 50% caustic potash liquor, 10 parts of hydrogenated wood resin and 4.67 parts of diethylaniline are high-speed stirred until an emulsion is obtained.

100 parts of the ground crude copper phthalocyanine pigment as described above and 200 parts of water at 50° C are added to the emulsion. The pigmented emulsion is high-speed stirred until the average particle size is 1 $\mu$ or less.

A solution of 5 parts of calcium chloride in 450 parts of water at 50° C is added, The pigment slurry is stirred for 30 minutes and 70.8 parts of hydrochloric acid and 60 parts of water at 50° C are added.

the acidified pigment slurry is filtered, washed with water until pigment is free of acid and chloride ions.

The $\beta$ pigment presscake is dried at 50–60° C.

EXAMPLE 4

92 parts of crude copper phthalocyanine pigment is ground in a ball-mill with 8 parts of phthalimide. Grinding is carried out until the phase change gives an $\alpha$ content of between 45 → 75%.

100 parts of water at 50° C, 22.5 parts of 50% caustic potash liquor, parts of hydrogenated wood resin and 46.75 parts of diethylaniline are high-speed stirred until an emulsion is obtained.

100 parts of the ground crude copper phthalocyanine pigment as described above and 200 parts of water at 50°C are added to the emulsion. The pigmented emulsion is high-speed stirred until the average particle size is 1 $\mu$ or less.

70.8 parts of hydrochloric acid and 60 parts of water at 50° C are added and the acidified pigment slurry is filtered, washed with water until pigment is free of acid and chloride ions.

The $\beta$ pigment presscake is dried at 50°–60° C.

EXAMPLE 5

92 parts of crude copper phthalocyanine pigment is ground in a ball-mill with 8 parts of phthalimide. Grinding is carried out until the phase change gives an $\alpha$ content of between 45 → 75%.

100 parts of water at 50° C, 22.5 parts of 50% caustic potash liquor, 6 parts of hydrogenated wood resin and 18.7 parts of diethylaniline are high-speed stirred until an emulsion is obtained.

100 parts of the ground crude copper phthalocyanine pigment as described above and 200 parts of water at 50° C are added to the emulsion. The pigmented emulsion is high-speed stirred until the average particle size is 1 $\mu$ or less.

A solution of 5 parts of calcium chloride in 450 parts of water at 50° C is added, the pigment slurry is stirred for 30 minutes and 70.8 parts of hydrochloric acid and 60 parts of water at 50° C are added.

The acidified pigment slurry is filtered, washed with water until pigment is free of acid and chloride ions.

The β pigment presscake is dried at 50°–60° C.

EXAMPLE 6

92 parts of crude copper phthalocyanine pigment is ground in a ball-mill with 5 parts of a hydrogenated wood resin. Grinding is carried out until the phase change gives an α content of between 45 → 75%.

100 parts of water at 50° C, 22.5 parts of 50% caustic potash liquor, 10 parts of hydrogenated wood resin and 4.67 parts of an aliphatic diamine R — NH $CH_2$ $CH_2$ $CH_2$ $NH_2$ where R is the tallow derivative are high-speed stirred until emulsion is obtained.

100 parts of the ground crude copper phthalocyanine pigment as described above and 200 parts of water at 50° C are added to the emulsion. The pigmented emulsion is high-speed stirred until the average particle size is 1 μ or less.

A solution of 5 parts of calcium chloride in 450 parts of water at 50° C is added, The pigment slurry is stirred for 30 minutes and 70.8 parts of hydrochloric acid and 60 parts of water at 50° C are added.

The acidified pigment slurry is filtered, washed with water until pigment is free of acid and chloride ions.

The β pigment presscake is dried at 50°–60° C.

EXAMPLE 7

92 parts of crude copper phthalocyanine pigment is ground in a ball-mill with 8 parts of phthalimide. Grinding is carried out until the phase change gives an α content of between 45 → 75%, 100 parts of water at 50° C, 22.5 parts of 50% caustic potash liquor, 10 parts of

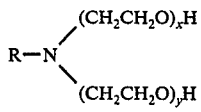

where R is the COCO derivative and $x + y = 2$, and 18.7 parts of diethylaniline are high-speed stirred until an emulsion is obtained.

100 parts of the ground crude copper phthalocyanine pigment as described above and 200 parts of water at 50° C are added to the emulsion. The pigmented emulsion is high-speed stirred until the average particle size is 1 μ or less.

70.8 parts of hydrochloric acid and 60 parts of water at 50° C are added and the acidified pigment slurry is filtered, washed with water until pigment is free of acid and chloride ions.

The β pigment presscake is dried at 50°–60° C.

EXAMPLE 8

92 parts of crude copper phthalocyanine pigment is ground in a ball-mill with 1 part of glyceryl mono oleate and 7 parts of phthalimide. Grinding is carried out until the phase change gives an α content of between 45 → 75%.

100 parts of water at 50° C, 2 parts of nonyl phenol ethylene oxide condensate (7 mols. ethylene oxide) and 18.7 parts of diethylaniline are high-speed stirred until an emulsion is obtained.

100 parts of the ground crude copper phthalocyanine pigment as described above and 200 parts of water at 50° C are added to the emulsion. The pigmented emulsion is high-speed stirred until the average particle size is 1 μ or less.

70.8 parts of hydrochloric acid and 60 parts of water at 50° C are added and the acidified pigment sluffy is filtered, washed with water until pigment is free of acid and chloride ions.

The β pigment presscake is dried at 50°–60° C.

EXAMPLE 9

92 parts of crude copper phthalocyanine pigment is ground in a ball-mill with 8 parts of phthalimide. Grinding is carried out until the phase change gives an α content of between 45 → 75%.

100 parts of water at 50° C, 22.5 parts of 50% caustic potash liquor, 12.5 parts of xylene sulphonic acid and 14 parts of n-butylamine are high speed stirred until an emulsion is obtained.

100 parts of the ground crude copper phthalocyanine pigment as described above and 200 parts of water at 50° C are added to the emulsion. The pigmented emulsion is high-speed stirred until the average particle size is 1 μ or less.

A solution of 5 parts of calcium chloride in 450 parts of water at 50° C is added, the pigment slurry is stirred for 30 minutes and 70.8 parts of hydrochloric acid and 60 parts of water at 50° C are added.

The acidified pigment slurry is filtered, washed with water until pigment is free of acid and chloride ions.

The β pigment presscake is dried at 50–60° C.

EXAMPLE 10

92 parts of crude copper phthalocyanine pigment is ground in a ball-mill with 16.2 parts of phthalimide. Grinding is carried out until the phase change gives an α content of between 45 → 75%.

100 parts of water at 50° C, 22.5 parts of caustic soda liquor, 7½ parts of dodecyl benzene sulphonic acid and 23.4 parts of dimethylaniline are high-speed stirred until an emulsion is obtained.

100 parts of the ground crude copper phthalocyanine pigment as described above and 200 parts of water at 50° C are added to the emulsion. The pigmented emulsion is high-speed stirred until the average particle size is 1 μ or less.

A solution of 5 parts of calcium chloride in 450 parts of water at 50° C is added, the pigment slurry is stirred for 30 minutes and 70.8 parts of hydrochloric acid and 60 parts of water at 50° C are added.

The acidified pigment slurry is filtered, washed with water until pigment is free of acid and chloride ions.

The β pigment presscake is dried at 50°–60° C.

EXAMPLE 11

92 parts of crude copper phthalocyanine pigment is ground in a ball-mill with 8 parts of phthalimide. Grinding is carried out until the phase change gives an α content of between 45 → 75%.

100 parts of water at 70° C, 22.5 parts of 50% caustic soda liquor, 10 parts of a tall-oil unsaturated resin and 25 parts of ortho-toluidine are high-speed stirred until an emulsion is obtained.

100 parts of the ground crude copper phthalocyanine pigment as described above and 200 parts of water at 70° C are added to the emulsion. The pigmented emulsion is high-speed stirred until the average particle size is 1 μ or less.

A solution of 5 parts of calcium chloride in 450 parts of water at 70° C is added, the pigment slurry is stirred for 30 minutes and 70.8 parts of hydrochloric acid and 60 parts of water at 70° C are added.

The acidified pigment slurry is filtered, washed with water until pigment is free of acid and chloride ions.

The β pigment presscake is dried at 50°-60° C.

EXAMPLE 12

100 parts of crude copper phthalocyanine pigment is ground in a ball-mill. Grinding is carried out until the phase change gives an α content of between 45 → 75%.

100 parts of water at 50° C, 2 parts of the sodium salt of dioctyl sulphosuccinate and 10 parts of aniline are high-speed stirred until an emulsion is obtained.

100 parts of the ground crude copper phthalocyanine pigment as described above and 200 parts of water at 50° C are added to the emulsion. The pigmented emulsion is high-speed stirred until the average particle size is 1 μ or less. 70.8 parts of hydrochloric acid and 60 parts of water at 50° C are added and the acidified pigment slurry is filtered, washed with water until pigment is free of acid and chloride ions.

The 62 pigment presscake is dried at 50°-60° C.

EXAMPLE 13

92 parts of crude copper phthalocyanine pigment is ground in a ball-mill with 8 parts of phthalic anhydride. Grinding is carried out until the phase change gives an α content of between 45 → 75%.

100 parts of water at 50° C, 22.5 parts of 50% caustic potash liquor, 10 parts of hydrogenated wood resin and 18.7 parts of diethylaniline are highspeed stirred until an emulsion is obtained.

100 parts of the ground crude copper phthalocyanine pigment as described above and 200 parts of water at 50° C are added to the emulsion. The pigmented emulsion is high-speed stirred until the average particle size is 1 μ or less.

A solution of 5 parts of calcium chloride in 450 parts of water at 50° C is added, the pigment slurry is stirred for 30 minutes and 70.8 parts of hydrochloric acid and 60 parts of water at 50° C are added.

The acidified pigment slurry is filtered, washed with water until pigment is free of acid and chloride ions. The β pigment presscake is dried at 50°-60° C.

EXAMPLE 14

92 parts of crude copper phthalocyanine pigment is ground in a ball-mill with 8 parts of phthalimide. Grinding is carried out until the phase change gives an α content of between 45 → 75%.

100 parts of water at 70° C, 2 parts of nonyl phenol ethylene oxide condensate comprising 7 mols of ethylene oxide per molecule of condensate, and 10 parts of oleyl amine are high-speed stirred until an emulsion is obtained.

100 parts of the ground crude copper phthanocyanine pigment as described above and 200 parts of water at 70° C are added to the emulsion. The pigmented emulsion is high-speed stirred until the average particle size is 1 μ or less.

116 parts of acetic acid in 60 parts of water at 70° C are added and the acidified pigment slurry is filtered, washed with water until pigment is free of acid.

The β pigment presscake is dried at 50°-60° C.

EXAMPLE 15

92 parts of crude copper phthalocyanine pigment is ground in a ball-mill with 8 parts phthalimide. Grinding is carried out until the phase change gives an α content of between 45 → 75%.

100 parts of water at 80° C, 2 parts of nonyl phenol ethylene oxide condensate comprising 7 mols of ethylene oxide per molecule of condensate, and 8 parts of piperidine are high-speed stirred until an emulsion is obtained.

100 parts of the ground crude copper phthalocyanine pigment as described above and 200 parts of water at 80° C are added to the emulsion.

The pigmented emulsion is high-speed stirred until the average particle size is 1 μ or less.

70.8 parts of hydrochloric acid and 60 parts of water at 80° C are added and the acidified pigment slurry is filtered, washed with water until pigment is free of acid and chloride ions.

The β pigment presscake is dried at 50°-60° C.

EXAMPLE 16

92 parts of crude copper phthalocyanine pigment containing 1.8% chlorine, which is prepared by reacting phthalic anhydride, 4-chlorophthalic acid, urea and cupric chloride in nitrobenzene using ammonium molybdate as catalyst, is ground in a ball-mill with 8 parts of phthalimide. Grinding is carried out until the phase change gives an α content greater than 95%

100 parts of water at 50° C, 22.5 parts of 50% caustic potash liquor, 10 parts of hydrogenated wood resin and 18.7 parts of diethylaniline are high-speed stirred until an emulsion is obtained.

100 parts of the ground chlorinated crude copper phthalocyanine pigment, as described above, and 200 parts of the water at 50° C are added to the emulsion. The pigmented emulsion is high-speed stirred until the average particle size is 1 μ or less.

A solution of 5 parts of calcium chloride in 450 parts of water at 50° C is added.

The pigment slurry is stirred for 30 minutes and 70.8 parts of hydrochloric acid and 60 parts of water at 50° C are added.

The acidified slurry is filtered, washed with water until pigment is free of acid and chloride ions.

The pigment presscake is dried at 50°-60° C giving a product containing 90% alpha modification.

EXAMPLE 17

A similar procedure to that described in Example 16 was followed but using 92 parts of crude copper phthalocyanine pigment containing 3% chlorine. After drying the pigment presscake at 50°-60° C a product was obtained containing 95% alpha modification.

EXAMPLE 18

A similar procedure to that described in Example 16 was followed but using 92 parts of crude copper phthalocyanine pigment containing 8.2% chlorine. After drying the pigment presscake at 50°-60° C a product was obtained containing 100% alpha modification.

EXAMPLE 19

92 parts of crude copper phthalocyanine pigment is ground in a ball mill with 8 parts of sodium acetate.

Grinding is carried out until the phase change gives an α content of between 45 → 75%.

100 parts of water at 50° C, 22.5 parts of 50% caustic potash liquor, 10 parts of hydrogenated wood resin and 18.7 parts of diethylaniline are high-speed stirred until an emulsion is obtained.

100 parts of the ground crude copper phthalocyanine pigment as described above and 200 parts of water at 50° C are added to the emulsion. The pigmented emulsion is high speed stirred until the average particle size is 1 μ or less.

A solution of 5 parts of calcium chloride in 450 parts of water at 50° C is added, the pigment slurry is stirred for 30 minutes and 70.8 parts of hydrochloric acid and 60 parts of water at 50° C are added.

The acidified pigment slurry is filtered, washed with water until pigment is free of acid and chloride ions.

The β pigment presscake is dried at 50°–60° C.

EXAMPLE 20

92 parts of crude copper phthalocyanine pigment is ground in a ball mill with 8 parts of phthalimide and 4 parts of sodium chloride. Grinding is carried out until the phase change gives an α content 45 → 75%.

100 parts of water at 50° C, 22.5 parts of 50% caustic potash liquor, 10 parts of hydrogenated wood resin and 18.7 parts of diethylaniline are high-speed stirred until an emulsion is obtained.

100 parts of the ground crude copper phthalocyanine pigment as described above and 200 parts of water at 50° C are added to the emulsion. The pigmented emulsion is high-speed stirred until the average particle size is 1 μ or less.

A solution of 5 parts of calcium chloride in 450 parts of water at 50° C is added, the pigment slurry is stirred for 30 minutes and 70.8 parts of hydrochloric acid and 60 parts of water at 50° C are added.

The acidified pigment slurry is filtered, washed with water until pigment is free of acid and chloride ions.

The β pigment presscake is dried at 50°–60° C.

I claim:

1. A process for preparing an alpha or beta form copper phthalocyanine pigment which comprises dry milling a crude copper phthalocyanine followed by mixing with an aqueous emulsion comprising a liquid amine having from 3 to 20 carbon atoms which is insoluble in water or alkali and soluble in acid and a surfactant which is capable of emulsifying the liquid amine and subsequently acidifying the mixture to dissolve the amine.

2. A process as claimed in claim 1 in which the milling is carried out in the absence of salt.

3. A process as claimed in claim 1 in which the dry milling is carried out either in the complete absence of liquids or in an amount of liquid small enough to ensure that the pigment retains the characteristics of a dry powder.

4. A process as claimed in claim 1 in which the milling is carried out in the presence of an additive which may act as a milling aid or improve the efficiency of the solvent treatment stage of the process or the performance of the final product.

5. A process as claimed in claim 1 in which the additive is phthalimide, phthalic anhydride, hydrogenated wood resin or glyceryl mono oleate.

6. A process as claimed in claim 4 in which the amount of additive used is from 5% to 15% by weight based on the weight of pigment.

7. A process as claimed in claim 1 in which the liquid amine is aniline, ortho-toluidine, diethylaniline, dimethylaniline, n-butylamine or an aliphatic diamine having the formula:

wherein R is the tallow derivative.

8. A process as claimed in claim 1 in which the amount of liquid amine is from 2% to 50% by weight based on the weight of pigment.

9. A process as claimed in claim 1 wherein the surfactant is sodium dodecylbenzene sulphonate, potassium xylene sulphonate or the sodium or potassium salt of a tall-oil unsaturated resin or hydrogenated wood resin.

10. A process as claimed in claim 1 wherein the surfactant is a coco amine or tallow amine derivative of the formula:

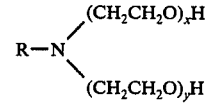

wherein R is a coco or tallow derivative and x and y are integers from 1 to 50.

11. A process as claimed in claim 1 in which the surfactant is an alkyl phenol-ethylene oxide condensate comprising 7 mols of ethylene oxide per molecule of condensate.

12. A process as claimed in claim 1 in which the amount of surfactant is from 1% to 15% by weight based on the weight of pigment.

13. A process as claimed in claim 1 in which the temperature of the treatment of the pigment with the emulsion is from 0° C to 100° C.